US006969087B2

(12) United States Patent
Larson

(10) Patent No.: US 6,969,087 B2
(45) Date of Patent: Nov. 29, 2005

(54) SEMI-TRACTOR TIRE RACK APPARATUS

(76) Inventor: Roger Scott Larson, 1302 Stoney Point Rd., NW., Cedar Rapids, IA (US) 52405

( * ) Notice: Subject to any disclaimer, the term of this patent is extended or adjusted under 35 U.S.C. 154(b) by 128 days.

(21) Appl. No.: 10/753,037

(22) Filed: Jan. 7, 2004

(65) Prior Publication Data

US 2005/0155994 A1 Jul. 21, 2005

(51) Int. Cl.[7] .............................................. B62D 43/02
(52) U.S. Cl. ................. 280/769; 224/42.29; 224/42.21
(58) Field of Search .......................... 224/42.21, 42.24, 224/42.23, 403, 42.12, 42.25, 402, 42.13, 224/505, 509, 517, 531, 533, 42.29, 42.3, 224/42.38; 280/769, 762; 414/466, 463

(56) References Cited

U.S. PATENT DOCUMENTS 1,881,222 A * 10/1932 Nichols et al. .......... 224/42.29
2,377,149 A * 5/1945 Heil .......................... 414/463
3,940,178 A 2/1976 Leveque .................... 296/37.2
4,076,158 A 2/1978 Barr ........................ 224/42.25
4,089,449 A 5/1978 Bayne et al. ........... 224/42.24
5,275,314 A 1/1994 Todenhagen ............ 224/42.01
5,388,737 A 2/1995 Myers et al. ........... 224/42.26
5,449,031 A * 9/1995 Burklund ...................... 157/1

* cited by examiner

*Primary Examiner*—Christopher P. Ellis
*Assistant Examiner*—John D. Walters
(74) *Attorney, Agent, or Firm*—Sturm & Fix LLP

(57) ABSTRACT

A transport apparatus (10) for carrying a spare tire (200) on the rear framework (101) of a semi-tractor (100) wherein, the apparatus (10) includes a base plate member (20) adapted to rotatably receive a vertical support rod member (30) having a rim support arm element (31) wherein, the base plate member (20) is further provided with an aperture (22) dimensioned to slidably receive the vertical segment (40") of a tire capture member (40) which also is slidably engaged with the vertical support rod member (30) and adapted to captively engage a spare tire (200) on the transport apparatus (10).

11 Claims, 2 Drawing Sheets

SEMI-TRACTOR TIRE RACK APPARATUS

CROSS REFERENCE TO RELATED APPLICATIONS

Not applicable.

BACKGROUND OF THE INVENTION

1. Field of the Invention

The present invention relates to the field of spare tire carriers in general and in particular to a spare tire transport apparatus specifically designed for semi-tractors.

2. Description of Related Art

As can be seen by reference to the following U.S. Pat. Nos. 5,276,314; 5,388,737; 4,089,449; 3,940,178; and, 4,076,158, the prior art is replete with myriad and diverse arrangements for transporting spare tires on a semi-tractor vehicle or the like.

While all of the aforementioned prior art constructions are more than adequate for the basic purpose and function for which they have been specifically designed, they are uniformly deficient with respect to their failure to provide a simple, efficient, and practical spare tire transport apparatus that stores the spare tire in a convenient and accessible location to minimize the effort involved in de-mounting a spare tire from the vehicle.

As most long distance truckers are all too well aware, the difficulty in replacing a tire on their rig is normally exacerbated by the inconvenient and generally obstructed location of the spare tire carriers on their vehicle which does nothing to facilitate the task at hand.

As a consequence of the foregoing situation, there has existed a longstanding need among semi-tractor drivers for a new and improved spare tire transport apparatus that carries the spare tire in a secure upright orientation on the semi-tractor and which may be easily disengaged from the spare tire when necessary and the provision of such an apparatus is the stated objective of the present invention.

BRIEF SUMMARY OF THE INVENTION

Briefly stated, the spare tire transport apparatus that forms the basis of the present invention comprises in general a base unit, a vertical support unit and a capture unit wherein, the base unit is adapted to be mounted on the rear portion of a semi-tractor, the vertical support unit is fixedly attached to the base unit and the capture unit is movably associated with both the base unit and the vertical support unit.

As will be explained in greater detail further on in the specification, the base unit comprises a base plate member that is adapted to be fixedly secured to a selected portion of a semi-tractor wherein, the base plate member is adapted to fixedly receive a portion of the vertical support member, movably receive a portion of the capture unit, and further provided with means for resisting the rotation of a spare tire carried by the transport apparatus.

In addition, the vertical support unit includes a vertical support rod member provided with an outwardly projecting generally L-shaped support arm having a downwardly depending support hook element wherein, the bottom of the support rod member is adapted to be captively received in the base plate member.

Furthermore, the capture unit comprises a generally L-shaped capture member the leg portion of which is slidably mounted on the lower end of the vertical support rod member and the foot portion of which is dimensioned to be slidably received in an aperture formed in the base plate member and further captively engaged by a releasable lock member.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein.

DETAILED DESCRIPTION OF THE INVENTION

Figure 1:
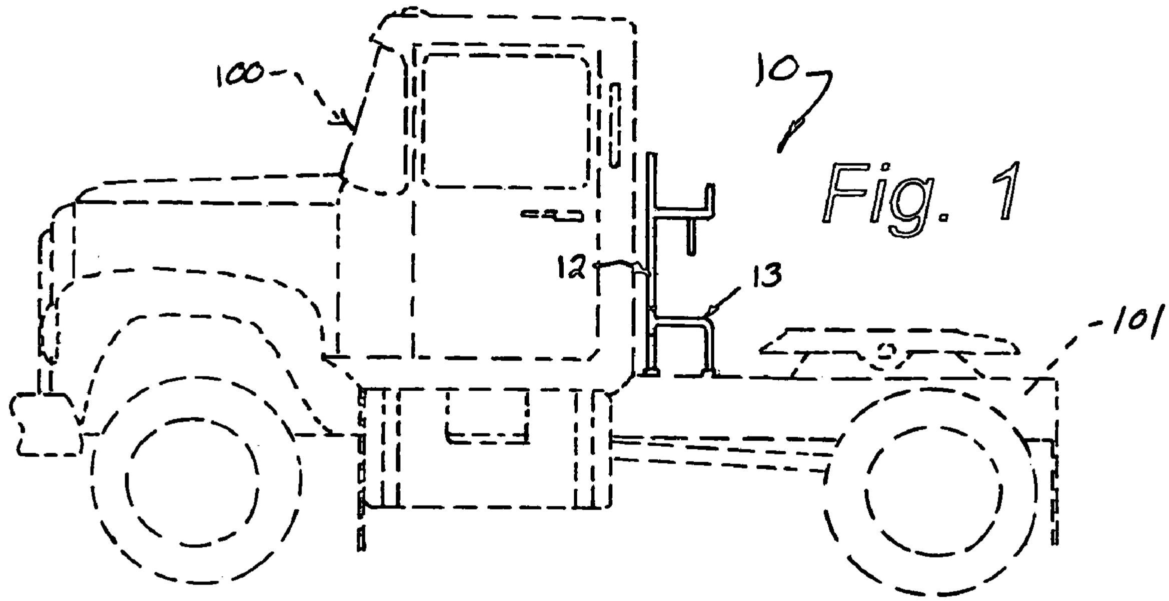
FIG. 1 is a side elevation view of the spare tire transport apparatus mounted on a semi-tractor.
Figure 2:
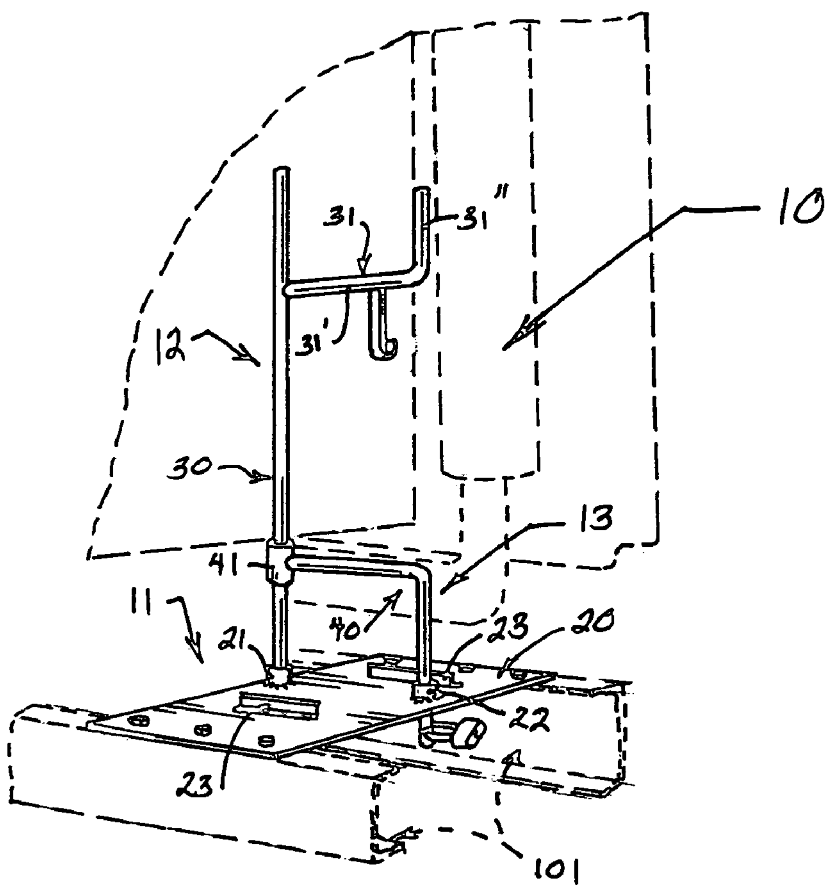
FIG. 2 is a perspective view of the arrangement depicted in FIG. 1.

As can be seen by reference to the drawings, and in particular to FIGS. 1 and 2, the spare tire transport apparatus that forms the basis of the present invention is designated generally by the reference number 10. The apparatus 10 comprises in general a base unit 11, a vertical support unit 12, and a tire capture unit 13. These units will now be described in seriatim fashion.

Figure 3:
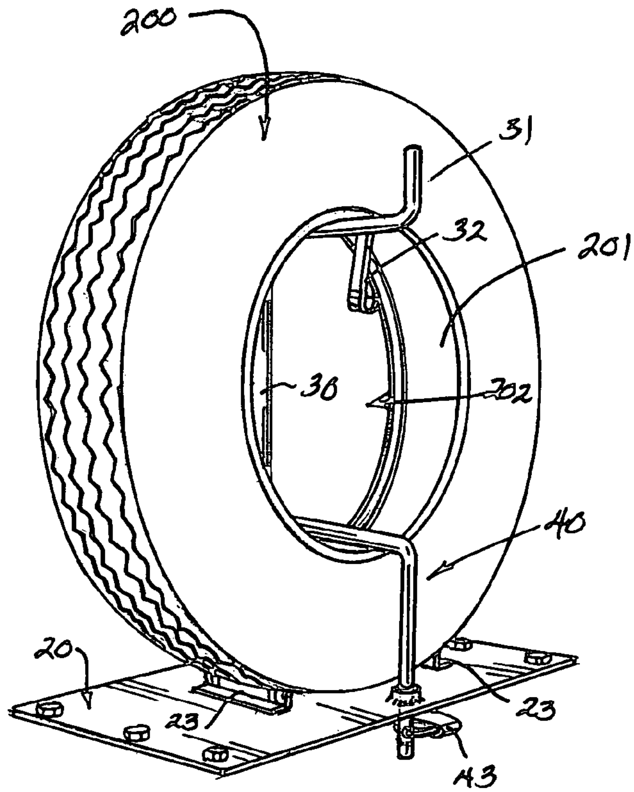
FIG. 3 is an isolated perspective view of the spare tire and transport apparatus; and, FIG. 4 is an exploded perspective view of all of the structural units that comprise the spare tire transport apparatus.
Figure 4:
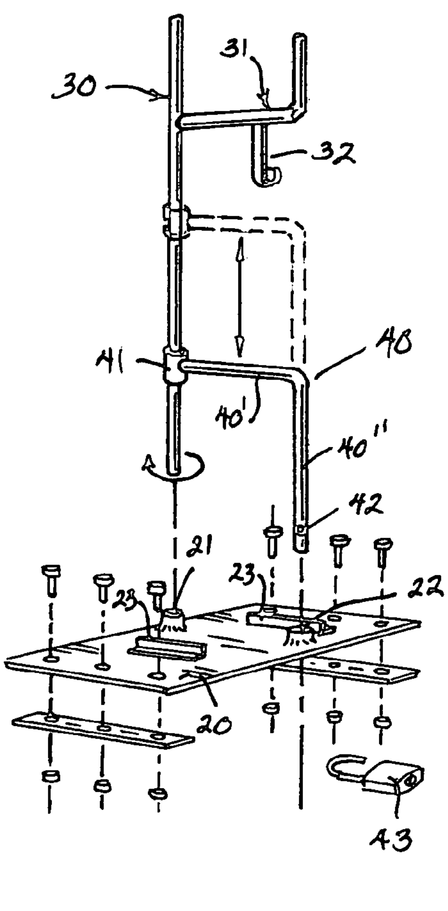

As shown in FIGS. 2 through 4, the base unit 11 comprises a generally flat rectangular base member 20 the opposite sides of which are adapted to be fixedly secured to the rear framework 101 of a semi-tractor 100.

In addition, the base member 20 is further provided with: a receptacle element 21 adapted to captively receive the lower end of the vertical support unit 12, an aperture 22 dimensioned to slidably receive a portion of the tire capture unit 13 and a pair of upwardly projecting flange elements 23 which will prevent the rotation of a spare tire 200 when captively engaged by the tire transport apparatus.

Turning now in particular to FIGS. 2 and 4, it can be seen that the vertical support rod member 30 the lower end of which is captively received in the receptacle element 21 of the base plate member 20 wherein, the upper portion of the vertical support rod member 30 is provided with a generally L-shaped support arm element 31. The support arm element 31 further includes a horizontal segment 31' that is spaced from the upper end of the support rod member 30 and a vertical segment 31" that is disposed parallel to and spaced from the upper end of the support rod member 30 to form a generally U-shaped cradle for receiving the upper portion of the rim 201 of a spare tire 200.

Furthermore, the horizontal segment 31' of the support arm element 31 is also provided with a downwardly depending hook element 32 the purpose and function of which will be described presently.

Returning once more to FIGS. 2 and 4, it can be seen that the tire capture unit 13 comprises a generally inverted L-shaped tire capture member 40 having a horizontal segment 40' the face end of which is provided with a collar element 41 that is dimensioned to be slidably received on the lower portion of the vertical support rod member 30 and having an elongated vertical segment 40" having an aperture 42 that is dimensioned to receive the harp of a lock element 43.

In operation, the vertical support rod member 40 is inserted into the receptacle 21 on the base plate member 20 and the capture member 40 is slid upwardly on the vertical support rod member 30 until the horizontal segment 40' of the capture member 40 can be engaged by the hook element 32 on the support arm element 31.

This will allow the lower end of the capture member 40 and the upper end of the support arm element 31 to pass through the opening 202 of the rim 201 of the spare tire 200. Then the tire capture member 40 is disengaged from the hook element 32 so that the apertured lower end of the capture member 40 can pass through the aperture 22 in the base plate member 20 so that the lock element 43 will captively retain the spare tire 200 on the apparatus 10.

Furthermore, as can be appreciated by reference to FIG. 4, the lower end of the vertical support rod member 30 is adapted to be rotatably received in the receptacle element 21 of the base plate member 20 to facilitate the installation and removal of the spare tire 200 relative to the apparatus 10.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

Having thereby described the subject matter of the present invention, it should be apparent that many substitutions, modifications, and variations of the invention are possible in light of the above teachings. It is therefore to be understood that the invention as taught and described herein is only to be limited to the extent of the breadth and scope of the appended claims.

I claim:

1. A spare tire transport apparatus for semi-tractors wherein, the transport apparatus comprises a base unit including a base plate member having a receptacle element and an aperture a vertical support unit including a vertical support rod member having a lower end and having an upper end provided with a generally L-shaped support arm element a tire capture unit including a generally inverted L-shaped tire capture member movably associated with the vertical support rod member and having a horizontal segment and having a vertical segment that is dimensioned to be slidably received in said aperture in the base plate member; and, means for captively engaging the lower end of the vertical segment of the tire capture member beneath the base plate member.

2. The apparatus as in claim 1; wherein, the lower end of the vertical support rod member is adapted to be rotatably received in the receptacle element of the base plate member.

3. The apparatus as in claim 1; wherein, the support arm element has a vertical segment and a horizontal segment provided with a downwardly depending hook element which is dimensioned to releasably receive the horizontal segment of the tire capture member.

4. The apparatus as in claim 2; wherein, the support arm element has a vertical segment and a horizontal segment provided with a downwardly depending hook element which is dimensioned to releasably receive the horizontal segment of the tire capture member.

5. The apparatus as in claim 1; wherein, the vertical segment of the tire capture member has a lower end that is provided with an aperture.

6. The apparatus as in claim 2; wherein, the vertical segment of the tire capture member has a lower end that is provided with an aperture.

7. The apparatus as in claim 3; wherein, the vertical segment of the tire capture member has a lower end that is provided with an aperture.

8. The apparatus as in claim 4; wherein, the vertical segment of the tire capture member has a lower end that is provided with an aperture.

9. The apparatus as in claim 1; wherein, the horizontal segment of the tire capture arm is provided with a collar element that is adapted to be slidably received on the vertical support rod member.

10. The apparatus as in claim 5; wherein, the means for captively engaging the lower end of the vertical segment of the tire capture element comprises a lock element having a harp that is dimensioned to pass through the aperture in the lower end of the vertical segment of the tire capture member.

11. The apparatus as in claim 1; wherein, said base plate member is further provided with a pair of upwardly projecting spaced flanges that are adapted to frictionally engage spaced portions of a spare tire.

* * * * *